United States Patent
Babin et al.

(10) Patent No.: US 6,429,929 B2
(45) Date of Patent: Aug. 6, 2002

(54) METHOD AND APPARATUS FOR MEASURING PHASE DIFFERENCES BETWEEN INTENSITY-MODULATED OPTICAL SIGNALS

(75) Inventors: François Babin, Charlesbourg; Normand Cyr, Sainte-Foy, both of (CA)

(73) Assignee: Exfo Electro-Optical Engineering INC, Vanier (CA)

( * ) Notice: Subject to any disclaimer, the term of this patent is extended or adjusted under 35 U.S.C. 154(b) by 0 days.

(21) Appl. No.: 09/821,032

(22) Filed: Mar. 30, 2001

Related U.S. Application Data (60) Provisional application No. 60/193,466, filed on Mar. 31, 2000.

(51) Int. Cl.$^7$ .............................................. G01N 21/00
(52) U.S. Cl. ........................................................ 356/73.1
(58) Field of Search ................................ 356/73.1, 478, 356/460, 368, 325; 250/227.19, 227.27, 225

(56) References Cited

U.S. PATENT DOCUMENTS 4,551,019 A    11/1985  Vella et al.
4,750,833 A    6/1988   Jones
4,799,789 A    1/1989   Tsukamoto et al.

FOREIGN PATENT DOCUMENTS

DE    40 18 379    12/1991
DE    197 26 931   1/1999
EP    280 329      8/1988

Primary Examiner—Frank G. Font
Assistant Examiner—Tu T. Nguyen
(74) Attorney, Agent, or Firm—Thomas Adams (57) ABSTRACT

In order to avoid errors inherent in the measurement of electrical phase differences or pulse arrival time in relative group delay measurements, different optical signals have their intensity modulated at a common high frequency and different permutations are selected. The amplitudes of corresponding electrical signals are detected and phase differences are computed on the basis of trigonometrical relationships. Because the modulation frequency is known, time differences can be deduced. Apparatus for measuring the phase differences conveniently comprises a slotted wheel (26) which passes selected ones or both of the optical signals. One of the optical signals may be split to produce a third signal with a predetermined phase shift, e.g. about 90 degrees at the modulation frequency and the amplitudes of some possible permutations of the three optical signals used to compute the phase difference. The measurements may be used to compute chromatic dispersion, polarization mode dispersion, elongation, and so on.

55 Claims, 4 Drawing Sheets

METHOD AND APPARATUS FOR MEASURING PHASE DIFFERENCES BETWEEN INTENSITY-MODULATED OPTICAL SIGNALS

This application claims priority from U.S. Provisional patent application No. 60/193,466 filed Mar. 31, 2000.

DESCRIPTION

1. Technical Field

This invention relates to a method and apparatus for measuring phase differences between intensity-modulated optical signals, especially, but not exclusively, for the determination of chromatic dispersion, polarization mode dispersion, changes in length/distance, and so on.

2. Background Art

It is often necessary or desirable to measure the relative group delay of intensity-modulated optical signals in elements of optical systems, especially, but not exclusively, optical fibers. Such measurements are necessary, for example, for evaluating such things as chromatic dispersion (CD), polarisation mode dispersion (PMD) or strain (fiber elongation). Of the various techniques for measuring relative group delay of optical signals, whether for distance measurements or for dispersion measurements, the most common involve the measurement of either time intervals between pulsed signals or phase differences between sine modulated signals, depending on how one modulates the intensity of the light. If one pulses the light, the time interval of interest is given by the measured time difference between a reference pulse (from a pulse generator or from a reference light pulse) and the optical signal pulse. There is uncertainty in quantifying the arrival times of the pulses because the pulses have a finite temporal extent and spreading of the pulses makes it difficult to detect them accurately. This, and jitter, render this technique usually less accurate than the direct measurement of phase shift.

Phase shift measurement techniques involve modulating the intensity of light from a light source (or from many light sources) using a sine modulated signal at a given sufficiently high frequency, typically at least 10 MHz for CD measurements. The, or each, resulting intensity-modulated optical signal usually has one major Fourier component. It travels through an optical path, is detected by an optical receiver and is transformed into an electrical signal. While travelling through the optical path, the optical signal is delayed and so, on arrival at the detector, has a phase difference with respect to a reference. During processing following detection, the resulting electrical signal also will experience additional delay relative to the reference.

The reference may be derived from the electrical signal used for the modulation of the light source(s)—usually from an electronic oscillator, or be derived from an electrical signal generated by a second optical signal (the modulation coming from the same reference oscillator) which has travelled a different optical path and has been detected by a second optical receiver. Time differences are obtained by determining phase differences between the two electrical signals, using electronic phase detectors.

In such known measurement methods, the time intervals or phase differences are measured in the electrical domain by an optical receiver that detects the modulated light and converts the optical signal into an electrical signal to be measured. The reference (from the reference oscillator or from the second optical receiver) and the signal to be measured do not follow the same electrical path (different path lengths, different gains, different filters . . . ), and the induced delays in the electrical domain are difficult to control or calibrate and are not related directly to the optical delays. Phase in electronic systems is especially difficult to stabilize, control or calibrate at high frequencies. Consequently, electronic phase errors add uncertainty to modulated optical signal phase shift measurements.

DISCLOSURE OF INVENTION

The present invention seeks to avoid these disadvantages and, to this end, in embodiments of the present invention two different optical signals intensity-modulated at the same frequency are permutated by a receiver to produce several different combination signals, converted to corresponding electrical signals at the frequency of modulation, and phase difference between the modulation of the two optical signals computed on the basis of trigonometrical relationships between the respective amplitudes of the combinations.

Because only the relative amplitudes of the electrical signals need be determined, the errors inherent in measuring pulse arrival time or electrical phase measurement can be avoided.

According to a first aspect of the present invention, a method of measuring phase differences between at least two optical signals both intensity-modulated at the same high frequency comprises the steps of sequentially selecting the two optical signals individually and in combination to produce a plurality of selected optical signals; deriving from the selected optical signals a corresponding electrical signal at the modulation frequency and having a series of different amplitudes corresponding to the different optical signal selections; and determining the different amplitudes; and using trigonometrical relationships between amplitude and phase difference, computing from the determined amplitudes the phase difference between the modulations of the first and second optical signals.

For measurement of chromatic dispersion, the method may comprise the step of varying the wavelength of one or both of the two optical signals, measuring the phase difference at each of a plurality of selected wavelengths, and deriving chromatic dispersion from the resulting plurality of phase difference and wavelength measurements.

For measurement of group delay in dependence upon state of polarization, the method may comprise the step of varying the state of polarization of one of the two optical signals and measuring the phase difference for each of a plurality of different states of polarization.

For measurement of elongation, the method may comprise the steps of varying the effective optical length of an element in the propagation path taken by one of the two optical signals and measuring the phase difference for each of a plurality of different lengths.

The two optical signals may be generated by splitting intensity-modulated light from a single source and directed along different propagation paths. Alternatively, the optical signals may come from two or more different light sources. The light source may provide the intensity-modulation in response to an electrical modulation signal originating from a reference oscillator. Where a plurality of light sources are used, they may be controlled by a single reference oscillator providing several electrical signals phase-locked together. Yet another option is for the optical signals produced by the one or more light sources to be passed through an external optical intensity modulator.

Part of one optical signal may travel a third path, producing a third intensity-modulated optical signal having modulation at the same high frequency, and a known relative propagation delay with respect to one of the other optical signals, preferably about 90 degrees at the modulation frequency. The afore-mentioned plurality of selected optical signals then may comprise also the third optical signal selected individually and/or in combination with each or both of the first and second optical signals.

According to a second aspect of the invention, apparatus for measuring phase difference between intensity-modulated optical signals comprises:

means for providing a first optical signal and a second optical signal both having the same high frequency modulation; a selection unit for selecting sequentially the first and second optical signals individually and in combination; means for deriving from the selected optical signals a corresponding electrical signal having a series of different amplitudes corresponding to the different selections; means for determining the amplitudes; and means for computing from the amplitudes, using trigonometrical relationships between amplitude and phase, a phase difference between the first and second optical signals.

Embodiments of the invention will now be described by way of example only and with reference to the accompanying drawings.

BEST MODE(S) FOR CARRYING OUT THE INVENTION

In the drawings, corresponding components in the different Figures have the same reference numbers, but with a prime to differentiate them.

Embodiments of the invention measure only the amplitude of the modulation of several optical signals modulated by the same high frequency modulation signal, and perform a series of computations based upon trigonometrical relationships to extract from the different amplitude measurements a measure of the phase differences between the optical signals. Because the frequency of the modulation is known (for example 100 MHz), the difference can be converted into a time difference or relative group delay. Further embodiments of the invention measure variations in the phase difference/relative group delay in order to determine, for example, chromatic dispersion, polarization mode dispersion, elongation, and so on.

Figure 1:
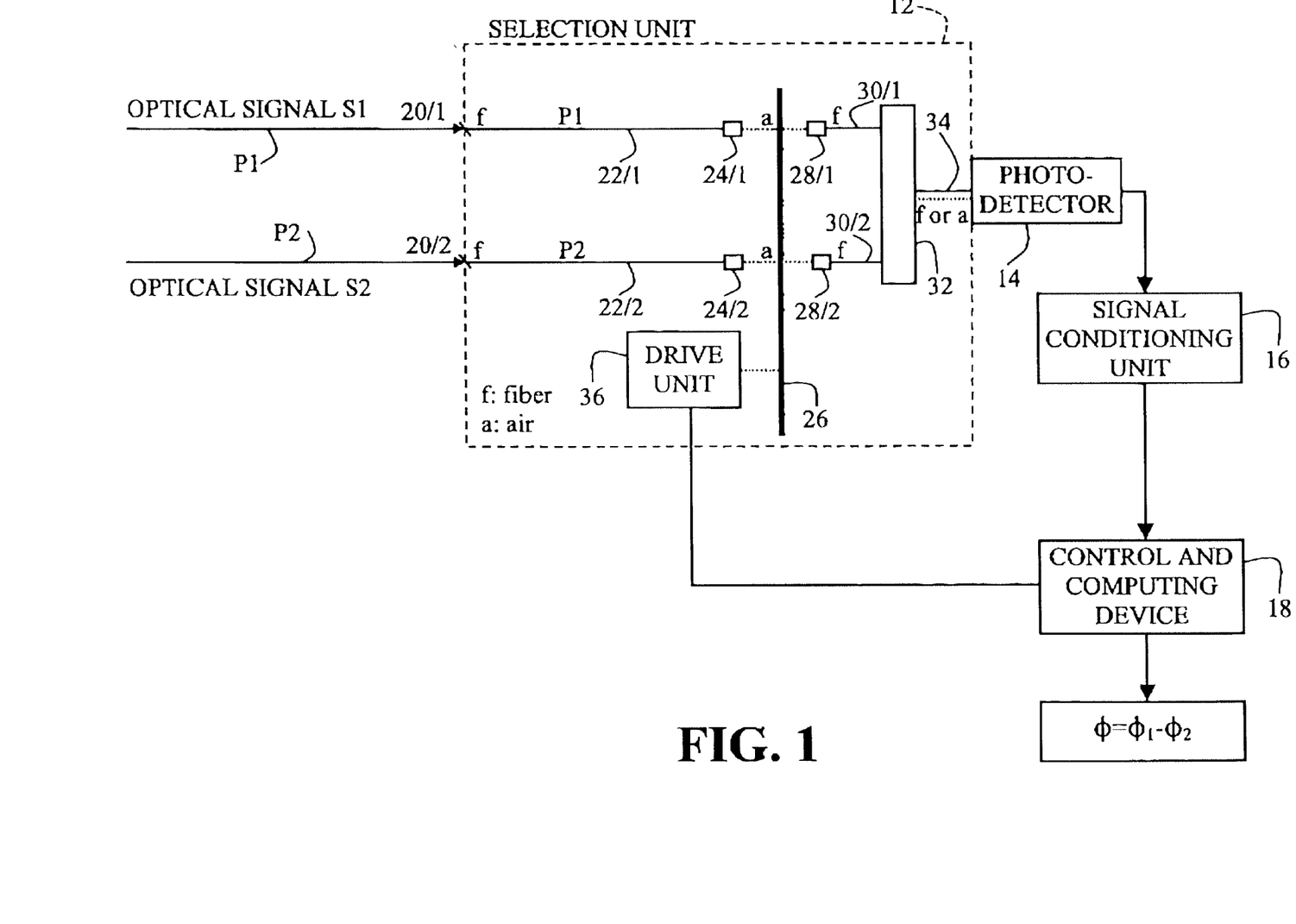
FIG. 1 is a schematic diagram of apparatus for measuring phase differences between optical signals intensity-modulated at the same high frequency.

The basic method of measuring phase difference will be described first. Referring to FIG. 1, intensity-modulated optical signals S1 and S2, between which the phase difference is to be measured, are supplied via paths P1 and P2 to input ports 20/1 and 20/2, respectively, of a selection unit 12. The optical signals S1 and S2 will be supplied by one or more sources (not shown in FIG. 1) which may be part of the apparatus or may be separate. In either case, the optical signals S1 and S2 may be directed to ports 20/1 and 20//2 by any suitable means, such as optical waveguides, for example optical fibers, or free space coupling. When received the modulation of signal S1 has an amplitude $A_{01}$ and a phase $\phi_1$ and the modulation of signal S2 has an amplitude $A_{02}$ and a phase $\phi_2$. The selection unit 12 receives the optical signals S1 and S2, respectively, selects different permutations of the two optical signals S1 and S2 and applies the selections to a photodetector 14, which converts them into a corresponding electrical signal and applies it to a signal conditioning unit 16, where it is amplified and filtered to detect the high frequency modulation, the peak-to-peak amplitude of which varies corresponding to the different selections. The signal conditioning unit 16 converts the extracted high frequency modulation signal to a varying dc signal, measures its different amplitudes and produces corresponding digital values. The digitized amplitude values are supplied to a control and computing unit 18, which could be an integral microcomputer or a personal computer. In a manner to be described later, the control and computing unit 18 uses the amplitudes to compute the phase difference $\phi=\phi_1-\phi_2$ between the modulation of signals S1 and S2, respectively. The control and computing unit 18 also controls the selection unit 12 and the signal conditioning unit 16 to synchronize the amplitude measurements and optical signal selections.

Within the selection unit 12, the optical signals S1 and S2 traverse separate sections of the optical paths P1 and P2, respectively. For convenience, similar components in the two paths have the same reference number but with the suffix /1 or /2 as appropriate. Thus, in the selection unit 12, input ports 20/1 and 20/2 are coupled by fibers 22/1 and 22/2 to collimators 24/1 and 24/2, respectively, the latter disposed at one side of a rotatable slotted wheel 26. Two collimators 28/1 and 28/2 disposed at the other side of the slotted wheel 26 are in register with the collimators 22/1 and 22/2, respectively, so that, if one of the slots of the slotted wheel 26 is interposed between either collimators 24/1 and 28/1 or collimators 24/2 and 28/2, the corresponding one of the optical signals S1 and S2 will pass, via the corresponding one of two fibers 30/1 and 30/2, respectively, to a combiner 32, The combiner 32 supplies the optical signal, or the combination of optical signals if both are passed, on path 34 (which may be fiber or air) to photodetector 14.

The slots in the wheel 26 are so disposed that, at different rotation angles, different permutations of the light beams S1 and S2 are selected to pass through the wheel 26. The selection sequence comprises the set of selections signal S1 alone, signal S2 alone, signals S1 and S2 together, and neither signal S1 nor signal S2.

The slotted wheel 26 is rotated continuously by a drive unit 36 under the control of the control and computing unit 18 so that the selection sequence is repeated many times. The control and computing unit 16 computes and stores the phase difference $\phi$ for each set of selections and may average to obtain an average phase difference $\phi_{av}$.

The way in which the control and computing unit 18 computes the phase difference $\phi$ from the amplitudes $A_{01}$ and $A_{02}$ (and of the combined signals) will now be described.

On arrival at the photodetector 14, the signal S1 in path P1 has an intensity modulation of maximum amplitude $A_{01}$ and phase $\phi_1$ for the major Fourier component, which can be written:

$$A_1 = A_{01} \sin(2\pi f_{mod} t + \phi_1)$$

where $f_{mod}$ is the modulation frequency. Similarly, for the signal S2 in path P2;

$$A_2 = A_{02} \sin(2\pi f_{mod} t + \phi_2)$$

Combiner 32 combines the light from both fibers 30/1 and 30/2 to produce a combined signal whose amplitude can be written:

$$A = A_1 + A_2 = A_{12} \sin(2\pi f_{mod} t + \phi_0)$$

Following conversion to an electrical signal, the signal conditioning unit 16 measures the amplitude of the electrical signal at intervals corresponding to the different slot selections by the rotating wheel 26. Initial measurements of amplitude will include an instrumental offset. The measurement taken with no light on the photodetector 14, i.e., with the slotted wheel 26 blocking the paths between the collimators 24/1 and 24/2 and their counterparts 28/1 and 28/2 so that neither signal passes, is used to cancel out this offset so that the measurements sent to the computing unit 18 comprise the amplitudes of the modulations $A_{12}$, $A_{01}$ and $A_{02}$ corresponding to selection of both signals S1 and S2, signal S1 alone, and then signal S2 alone, respectively. The control and computing unit 18 processes them as follows:
Since:

$$A_{12} = [A_{01}^2 + A_{02}^2 + 2A_{01}A_{02} \cos(\phi_1 - \phi_2)]^{1/2}$$

Then:

$$\cos(\phi_1 - \phi_2) = (A_{12}^2 - A_{01}^2 - A_{02}^2)/(2A_{01}A_{02})$$

and phase difference $\phi = \phi_1 - \phi_2 = \arccos[(A_{12}^2 - A_{01}^2 - A_{02}^2)/(2A_{01}A_{02})]$ Very often, the phase difference $\phi$ will not be the variable of interest. In many applications, it will be more useful to know the equivalent time difference or relative group delay. Because the modulation frequency $f_{mod}$ is known, the time difference/relative group delay can be computed from the phase difference.

Theoretically, these measurements are sufficient for obtaining phase difference (and thus time difference), and this is generally true for phase differences close to 90°. In practice, however, when the phase difference is close to zero (or an integer times π radians), the result is very sensitive to slight errors in amplitude measurements. Consequently, it is preferable to add a third optical signal and thus facilitate a greater number of selections. This can be done by adding to the selection unit 12 a splitter and another pair of collimators, increasing the number of slots in the slotted wheel, and making corresponding modifications to the software in the control and computing unit 18 so as to allow for the additional selections.

Figure 2:
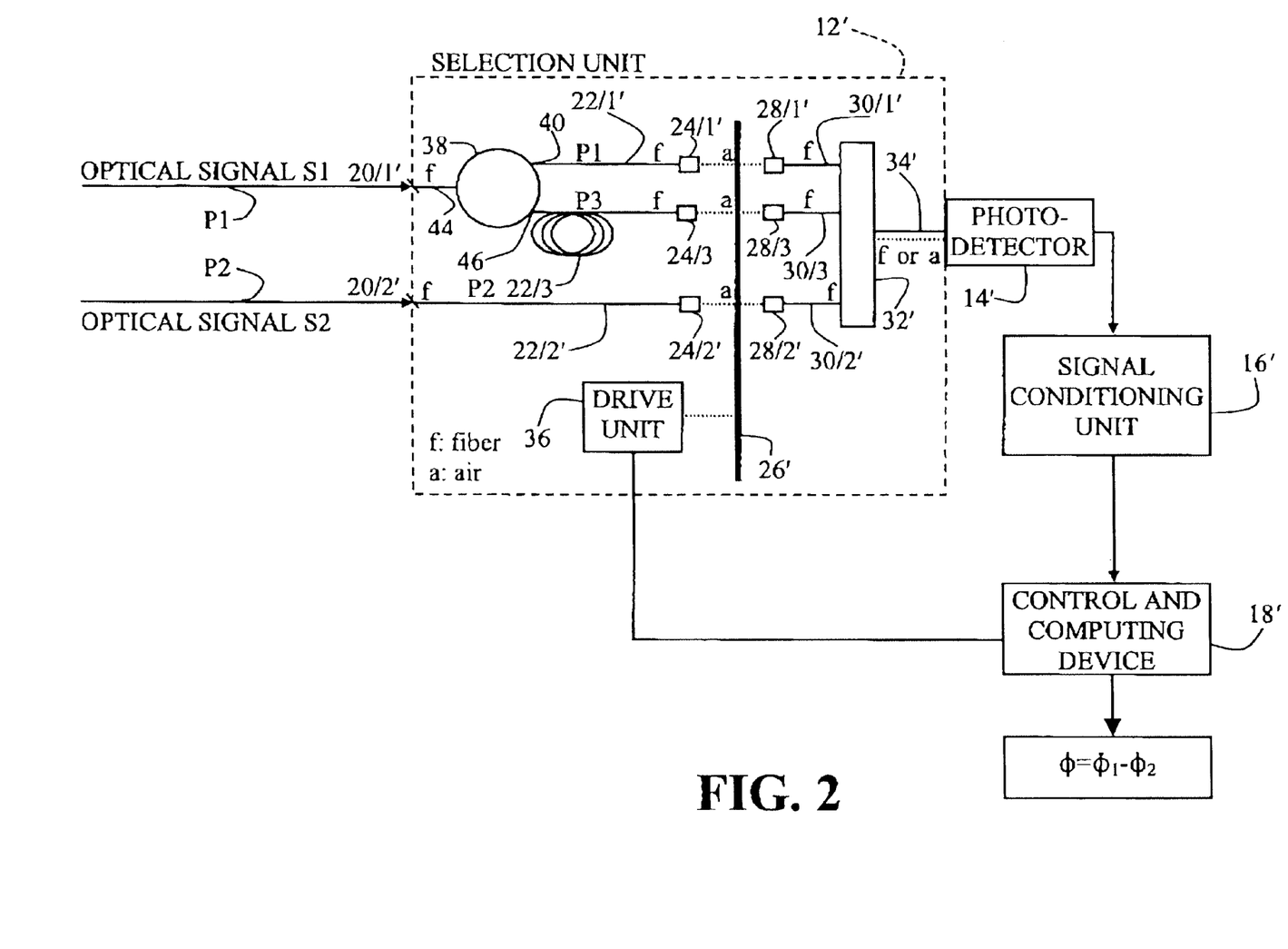
FIG. 2 illustrates a modified phase difference measurement apparatus.

As shown in FIG. 2, such a modified selection unit 12' comprises a splitter 38, a first set of three collimators 24/1', 24/2' and 24/3 disposed on one side of the rotatable slotted wheel 26', and a second set of three collimators 28/1', 28/2' and 28/3 disposed on the other side of the slotted wheel 26'. The outputs of the collimators 28/1', 28/2' and 28/3 are supplied, as before, by way of fibers 30/1', 30/2' and 30/3 to combiner 32' which passes the signal(s) to photodetector 14'. The corresponding combination electrical signals from the photodetector 14' are passed to signal conditioning unit 16' for amplification, filtering, amplitude detection and digitization, using conventional techniques which need not be described in detail here.

Input port 20/2' of the modified selection unit 12' is coupled, as before, directly by a length of optical fiber 22/2' to the second collimator 24/2'. Fiber 22/1', however, connects collimator 24/1' to output port 40 of splitter 38, which has its input port 42 connected by a fiber 44 to input port 20/1' of selection unit 12'. A second output port 46 of the splitter 38 is connected by a fiber 22/3 to third collimator 24/3. The splitter 38 splits the light from fiber 44 into two optical signals S1 and S3. Signal S1 travels along path P1, which now also includes the splitter 38 and fiber 44. Signal S3 travels along path P3 which includes fiber 44, the splitter 38, fiber 22/3, the collimators 24/3 and 28/3 and the air gap between them, the fiber 30/3, and the combiner 32'.

Path P3 is longer than path P1 by an amount sufficient to introduce a phase shift of about 90 degrees at the frequency of the modulation signal. The collimators 28/1', 28/2' and 28/3 receive the collimated light in different combinations as determined by the slots in the slotted wheel 26' which, of course, will have a different pattern of slots because there are now three light signals S1, S2 and S3 to be selected in various permutations. The collimators 28/1', 28/2' and 28/3 supply the different selections via fibers 30/1', 30/2' and 30/3, respectively, to combiner 32' which combines them and supplies the combined light to photodetector 14'. Preferably, combiner 32' is a set of three collimators, one for each fiber, bundled together, and followed by an appropriate lens. Alternatively, combiner 32' may be a set of fused fiber optic couplers with the appropriate coupling ratios.

In this case, therefore, there are three optical paths P1, P2 and P3 through the optical part of the selection unit 12'. The first path P1 constitutes a zero degree reference path of the device, while the third path P3 with the longer optical length comprises a 90 degrees reference path. The optical length difference between these two paths is equal to:

$$\Delta l = \frac{c(4N+1)}{4nf_{mod}}$$

where $\Delta l$ is the optical length difference, c is the speed of light in vacuum, N is an integer number between 0 and ∞, n is the refractive index of the fiber core of fibre 22/3 and $f_{mod}$ is the high modulation frequency of the light. Even if the lengths are such that the modulated optical signals in the two reference paths P1 and P3 do not have exactly 90 degrees of phase difference when recombined, this phase difference could be measured, as described previously, and used for the computations. The second optical path P2 carries optical signal from fiber input port 20/2'.

There are now eight possible combinations for the light beams going through slotted wheel 26', namely (i) signal S1 alone; (ii) signal S2 alone; (iii) signal S3 alone; (iv) signal S1+signal S2, (v) signal S1+signal S3; (vi) signal S2+signal S3; (vii) none of them; and (viii) all three signals S1, S2 and S3. For convenience, combination (viii) is not used, so the rotation of slotted wheel 26' repeatedly cycles through the first seven possible combinations (i) to (vii) at a low frequency (typically tens to hundreds of Hertz).

Photodetection means 14' detects the combined optical signal from combiner 32', and generates an electrical signal. The signal conditioning unit 16' amplifies and filters the electrical signal, and measures a signal proportional to the peak-to-peak amplitude of the modulation for each selection made by the slotted wheel 26'. The signal conditioning unit 16' digitizes the amplitude values and sends the values to the computing device 18' which computes the phase or relative group delay information. The control and computing unit 18 controls the slotted wheel 26' so that the amplitude measurements correspond to the different positions of the slotted wheel 26'. In this case and assuming that path P3 is longer than path P1, creating a 90-degree phase, the process for computing the phase difference $\phi = \phi_1 - \phi_2$ is as follows:

Signal selections S1 alone, S2 alone, signal S1+signal S2, and nothing, give the same result as previously described with reference to FIG. 1. Using signal S2 alone, S3 alone, and signal S2+signal S3, we get another equivalent relationship;

$$\cos(\phi_2 - \phi_3) = (A_{23}^2 - A_{02}^2 - A_{03}^2)/(2A_{02}A_{03})$$

And, because of the 90° relationship between $\phi_1$ and $\phi_3$;

$$\sin(\phi_1 - \phi_2) = (A_{23}^2 - A_{02}^2 - A_{03}^2)/(2A_{02}A_{03})$$

And, finally;

$$\phi_1 - \phi_2 = \arctan\{[(A_{23}^2 - A_{02}^2 - A_{03}^2)(2A_{01}A_{02})]/[(A_{12}^2 - A_{01}^2 - A_{02}^2)(2A_{02}A_{03})]\}.$$

Or more completely, in radians;

$$\phi_1 - \phi_2 = \arg\{[(A_{12}^2 - A_{01}^2 - A_{02}^2)/(2A_{01}A_{02})] + i[(A_{23}^2 - A_{02}^2 - A_{03}^2)/(2A_{02}A_{03})]\}$$

It should be appreciated that, if path P3 is shorter than path P1, again creating a 90-degree phase shift, analogous computations may be made but with the sign of the sine function changed, i.e. negative.

Although the use of the third path P3 requires this slightly more complicated switching scheme, it advantageously renders the whole process less sensitive to measurement errors. To be even more complete and self calibrating, it would be possible to measure the amplitude for signal S1+signal S3, in case the phase difference between paths 1 and 3 is not exactly 90°, and correct the above equations correspondingly.

An advantage of using the additional path with a physical length increased by an amount equal to 90° of phase shift at the high modulating frequency is that it enables the phase difference, and hence group delay, to be measured over $2\pi$ radians (a full cycle) instead of only $\pi$ radians in the case of the two path approach.

Whichever of the above-described phase difference measurement methods is used, it will usually be preferable to repeat the phase difference measurements many times, by repeating the selection sequence at a much lower frequency than the high frequency intensity modulation. The average phase difference could then be computed over many cycles in order to get a more precise value. The faster the low frequency cycling, the better the rejection of so-called 1/f noise, i.e., noise related to the time difference between any two amplitude measurements; the shorter this time, the lower the 1/f noise effect.

Figure 3:
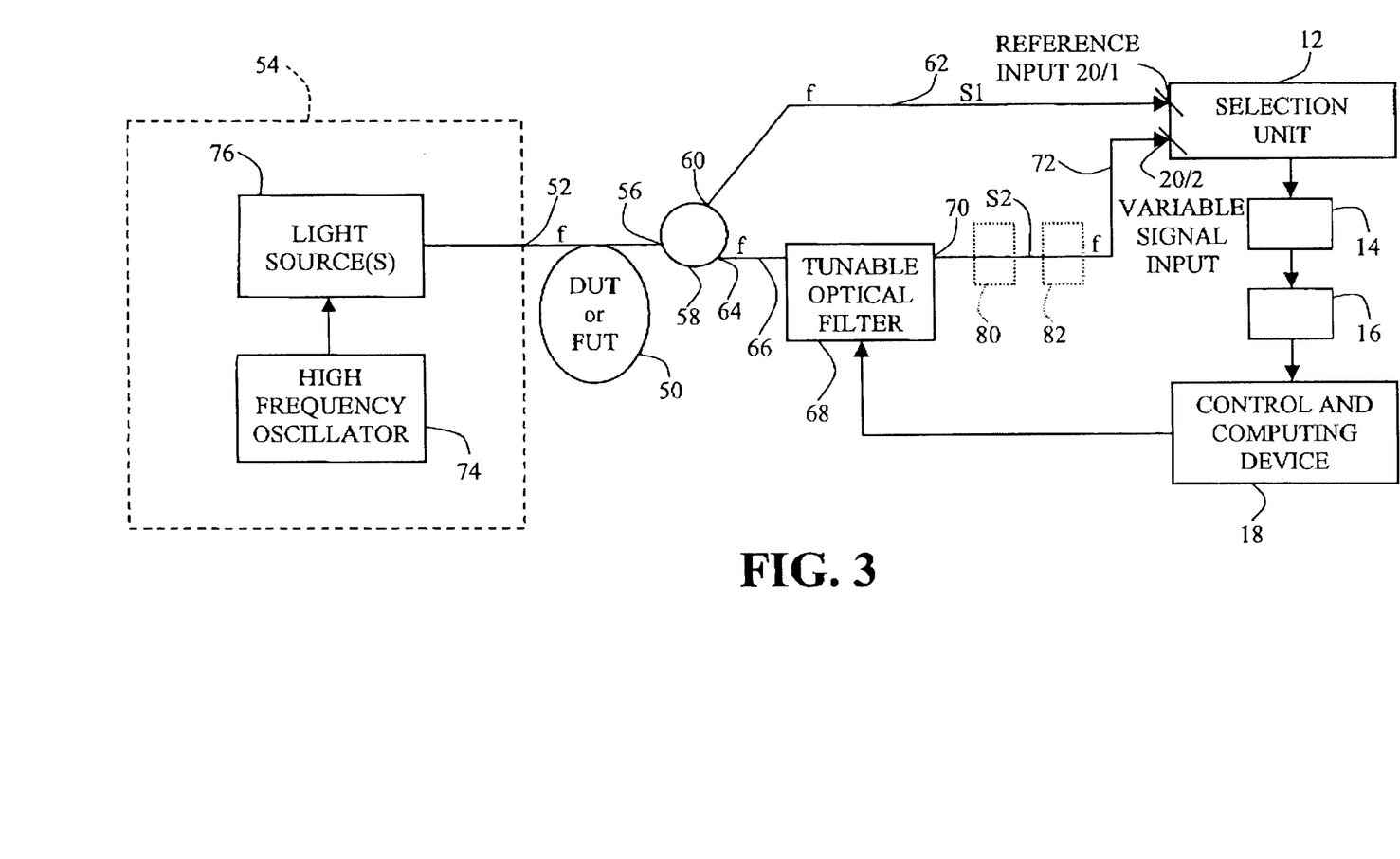
FIG. 3 is a schematic block diagram of apparatus for measuring chromatic dispersion using the phase difference measuring apparatus of FIG. 1.

As mentioned earlier, either of the above-described apparatus and methods for measuring phase differences between intensity-modulated optical signals may be used for many applications. FIG. 3 illustrates application to the measurement of chromatic dispersion in a device-under-test (DUT) or fiber-under-test (FUT) 50 which is connected at one end to an output port 52 of a multi-wavelength light source unit 54 and at the other end to an input port 56 of a splitter 58. One output port 60 of the splitter 58 is coupled directly to input port 20/1 of the phase difference measuring unit 10 by a fiber 62 and supplies the intensity modulated optical signal S1 thereto. A second output port 64 of splitter 58 is coupled by a fiber 66 to a tunable optical filter 68 controlled by control and computing unit 18. The output port 70 of the tunable optical filter 68 is coupled by a fiber 72 to input port 20/2 of the phase difference measuring unit 10 and supplies the intensity-modulated optical signal S2 thereto. Preferably, the splitter 58 is a drop filter, but an optically broadband 3 dB fused fiber optic coupler, or another coupler with a different coupling ratio, could be used instead.

Assuming that the first optical path P1 has a first value of a transmissive parameter, i.e. wavelength $\lambda_1$, and the signal passing along it arrives at the photodetector 14 with a first group delay $t_1$, and that the second optical path P2 has a second value of the transmissive parameter $\lambda_2$, and the corresponding signal a second group delay $t_2$ on arrival at the photodetector 14, then the corresponding measured phase difference $\phi_1 - \phi_2$ is proportional to group delay difference $t_1 - t_2$. It should be appreciated that the optical paths each extend from the source to the detector 14.

In operation, the control and computing unit 18 controls the tunable filter 68 to select a plurality of different wavelengths for the optical signal S2, computes values of $\phi_1 - \phi_2$ for each of the different wavelengths selected by the tunable filter 68 and uses the data to compute chromatic dispersion of the DUT/FUT 50.

Figure 4:
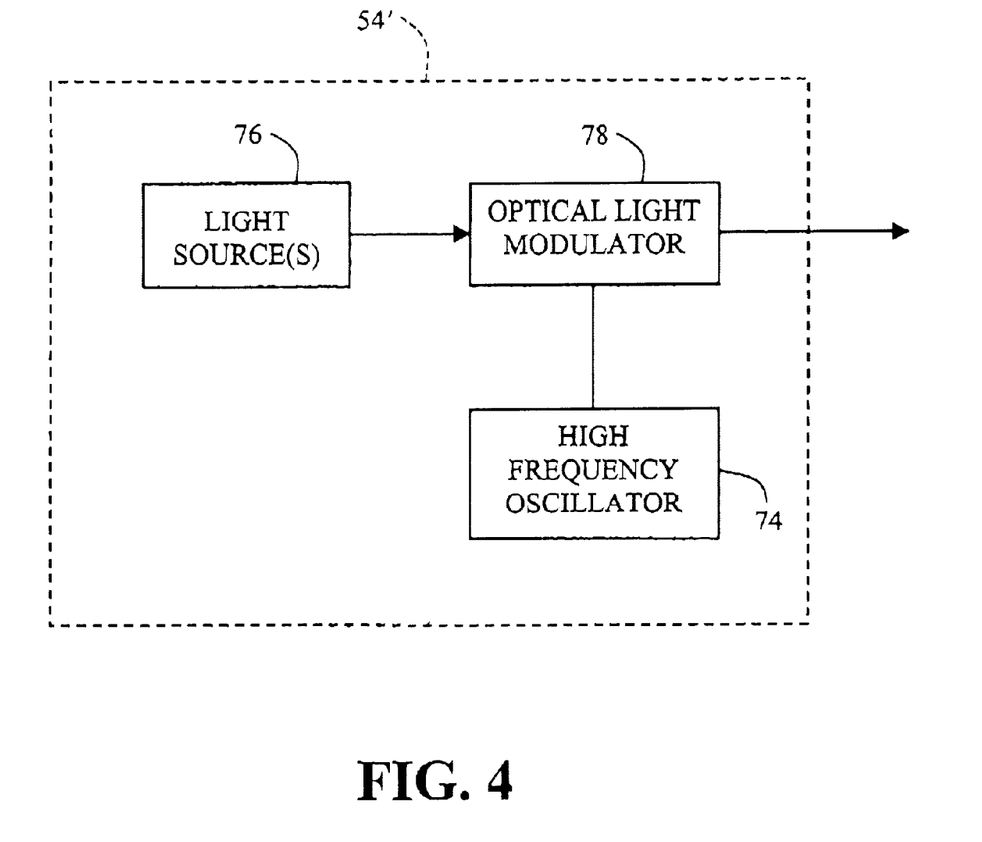
FIG. 4 is a detail drawing of an alternative light source arrangement.

The light source unit 54 provides light with at least two wavelengths, which are necessary in order to measure chromatic dispersion. The intensity (i.e., optical power) of the light is modulated at a high frequency by means of a high frequency electronic signal from an oscillator 74 which modulates, for example, the current fed to an optically broadband light emitting diode 76. As shown in FIG. 4, however, alternatively, the modulation could be applied by an external, for example electro-optic or acousto-optic, modulator 78 controlled by the oscillator 74. These alternative ways of providing the modulation could also be applied to a single light source.

The modulated light travels along/through the DUT/FUT 50. The high frequency intensity modulation travels at a speed usually dependent on optical wavelength and input optical polarization. To determine chromatic dispersion, differences in travel time between modulations at different optical wavelengths are measured. In order to measure the correct value, polarisation effects must be averaged out, calibrated or compensated by using, for example, an unpolarized source.

Optical splitter 58 splits the light from DUT/FUT 50 in a predefined manner to provide the optical signals S1 and S2. Optical signal S1 has a fixed centre wavelength and fixed full optical width at half maximum, and is supplied via fiber 62 directly to the first input port 20/1 of the measurement unit 10, i.e., without its wavelength being changed, and is used as a reference. The remainder of the optical signal passes via fiber 66 to tunable filter 68. Tunable optical filter 68 is controlled by control and computing unit 18 to vary the wavelength of the optical signal S2 before supplying it via fiber 72 to second input port 20/2 of the measurement unit 10. Where the light source 76 is an optically broadband emitting device (such as a light emitting diode), the tunable optical filter 68 may be a thin film interference filter, a grating monochromator, an acousto-optic filter or other such device which will select different wavelengths.

It should be noted that the DUT/FUT 50 could be placed between the combiner 32' and the photodetector 14', i.e. the optical filtering, splitting, modifying, switching and recombination can be done at the input end of the DUT/FUT 50.

The filtering can be done anywhere between the source and the photodetector. The reference can go through the DUT-FUT, or not.

The output of measurement unit 10, which is a digitized signal representing a sequence of different amplitude measurements, is supplied to control and computing unit 18 which computes a phase difference φ, as described previously, at the wavelength set by the tunable optical filter 68. The control and computing unit 18 stores the phase difference value, along with the centre wavelength value of the tunable optical filter 68, for example in computer memory (not shown). The control and computing unit 18 then changes the centre wavelength of the tunable optical filter 68 repeats the measurement of phase difference for the new wavelength and stores the value of phase difference for the new wavelength. This process is repeated for a number of centre wavelengths of tunable optical filter 68, the control and computing unit 18 computing and storing time delay differences and wavelength data each time. When sufficient data has been accumulated, the control and computing unit 18 uses the stored time delay data and wavelength data to compute chromatic dispersion in a user-defined way or in any standardized way (FOTP 169, FOTP 175). Procedures for computing chromatic dispersion from time delay and wavelength data are well known in the art and so will not be described here.

It will be appreciated that the phase difference measurements could be made using the modified measurement unit 10' (FIG. 2) and associated method, as described hereinbefore.

It should be noted that the modulation frequency typically will be higher than 10 MHz so that it has a period that is short enough to measure chromatic dispersion precisely, yet long enough for a period to last at least as long as the longest time difference to be measured. Also, it must be much shorter than the time taken for each slot in the slotted wheel 26' to traverse the light path.

It should also be appreciated that the multi-wavelength light source 76 and tunable filter 68 could be replaced by a narrowband tunable light source (and appropriate reference source), controlled by the control and computing unit 18.

It should also be appreciated that the chromatic dispersion could be measured by varying the wavelength of both signals before application to input ports 20/1 and 20/2 of the selection unit 12'.

The invention is not limited to the measurement of chromatic dispersion but rather may be used for various other applications. For example, it can be used to measure polarization mode dispersion, If the difference between the paths is only optical path length, it can be used to measure optical path length differences.

The phase difference measurement scheme described hereinbefore can be used for measuring relative time delays between high frequency modulated optical signals of different states of polarization having travelled through a DUT or FUT. The maximum relative time delay for all states of polarization can be stored along with the wavelength for a number of measurements at different wavelengths.

The apparatus would be similar in many ways to the chromatic dispersion measurement apparatus shown in FIG. 3. A high frequency intensity modulated multi-wavelength unpolarised source is coupled into the DUT/FUT. At the output end of the DUT/FUT, the splitter 58 extracts an unpolarized part of the light centered on a particular wavelength. This is the reference signal S1 which is applied to port 20/1 of the selection unit 12' (in measurement unit 10'). The remainder of the light goes to a low Polarization Dependent Loss (PDL) tunable monochromator (i.e. the tunable optical filter 68). The difference is that, after the tunable filter monochromator 68, there is a polarization controller 80 (shown in broken lines in FIG. 3) covering every SOP, followed by a polarizer 82 (also shown in broken lines). The selected SOP in this path is varied in order to find a minimum and maximum phase shift with respect to the reference S1. The difference between these maximum and minimum phase shifts is computed and then stored along with wavelength. The process is repeated for other wavelengths. These measured differences in phase shift (or differences in group delay) at multiple wavelengths are representative of the differential group delay (DGD) as a function of wavelength (the maximum difference in group delay is equal to the DGD in low PDL conditions, but not for large PDLs (>1 dB)). This data can be processed to compute mean or rms DGD, within the wavelength range of the measurement, or to compute other PMD statistics according to standardized procedures (FOTP122 for example).

For measurement of path length differences, a varying optical path length is introduced in path 2, that could be caused, for example, by stretching a Fiber Under Test. Since only one wavelength is needed, the tunable filter 68 may be omitted and the source need not be broadband. Also, the splitter 58 need not be a drop filter. The group delay difference measurements are repeated in time. These repeated measurements indicate the elongation or compression of the DUT or FUT.

It should be noted that the invention embraces apparatus equipped with a suitable control interface and custom software for use with a separate personal computer.

INDUSTRIAL APPLICABILITY

An advantage of embodiments of the present invention is that phase differences between intensity modulated optical signals are determined by measuring amplitude only, which avoids difficulties inherent in techniques for measuring pulse arrival time or electrical phase shifts. More particularly, the phase of the modulated electrical signal generated by the photodetector is no longer relevant, thereby greatly simplifying the detection process.

What is claimed is:

1. A method of measuring phase differences between at least first and second intensity-modulated optical signals (S1,S2) modulated at the same modulation frequency comprising the steps of:
   (i) sequentially applying the two optical signals individually and then in combination to an opto-electric conversion means to produce, at an output of the opto-electric conversion means, a corresponding electrical signal at the modulation frequency having a series of different amplitudes corresponding to the first and second optical signals and their combinations,
   (ii) determining the different amplitudes; and
   (iii) using trigonometrical relationships between amplitude and phase angle, computing from the determined amplitudes the phase difference ($\phi_1-\phi_2$) between the first and second intensity-modulated optical signals.

2. A method according to claim 1, wherein the amplitudes at the modulation frequency, correspond to each of the first (S1) and second (S2) optical signals alone, and the sum of the first and second optical signals.

3. A method according to claim 2, wherein the amplitudes, at said modulation frequency, correspond also to neither of the optical signals (S1,S2) being selected and the resulting amplitude value is used for offset correction.

4. A method according to claim 1, wherein, where the first optical signal (S1) has intensity modulation of instantaneous amplitude $A_1=A_{01} \sin(2\pi f_{mod}t+\phi_1)$ where $A_{01}$ is the maximum amplitude and $\phi_1$ is the phase for the major Fourier component and modulation frequency ($f_{mod}$), the second optical signal (S2) has intensity modulation of instantaneous amplitude $A_2=A_{02} \sin(2\pi f_{mod}t+\phi_2)$ where $A_{02}$ is the maximum amplitude and $\phi_2$ the phase for the major Fourier component and modulation frequency ($f_{mod}$), and the combined signal has an instantaneous amplitude $A=A_1+A_2=A_{12} \sin(2\pi f_{mod}t+\phi_0)$ where $A_{12}$ is the maximum amplitude of the combined first and second optical signals, the control and computing means (18) computes the phase difference ($\phi$) as:

$$\phi=\phi_1-\phi_2=\arccos[(A_{12}^2-A_{01}^2-A_{02}^2/(2A_{01}A_{02})]$$

5. A method according to claim 1, wherein the first and second optical signals are provided by splitting a single intensity-modulated light beam from a single source controlled by a reference oscillator.

6. A method according to claim 1, wherein the first and second optical signals are provided by first and second light sources, respectively, controlled by phase-locked signals from a reference oscillator.

7. A method according to claim 1, wherein the first and second optical signals are provided by a single light source and modulated by an optical modulator.

8. A method according to claim 1, wherein the first and second optical signals are provided by first and second light sources, respectively, and modulated by an optical modulator.

9. A method according to claim 1, further comprising the steps of passing one or both of the intensity-modulated optical signals (S1, S2) through a selected optical element (50), performing the phase difference measurement steps for each of a plurality of different optical wavelengths of the optical signals, and using the resulting wavelengths and plurality of phase difference measurements to compute chromatic dispersion of the optical element.

10. A method according to claim 1, further comprising the step of varying the state of polarization of one of the optical signals at a specific wavelength, performing the phase difference measurement steps for each of a plurality of different such states of polarization, and using the resulting plurality of phase difference measurements to compute the maximum difference in group delay for the different states of polarization.

11. A method according to claim 1, further comprising the steps of passing one of the optical signals through an optical element, varying the effective optical length of the optical element, performing the phase difference measurement steps for each of a plurality of different lengths, and using the resulting plurality of phase difference measurements to compute optical length differences.

12. A method according to claim 1, further comprising the additional steps of:
(iv) providing a third optical signal (S3) intensity-modulated at said modulation frequency, the third optical signal modulation having a predetermined phase difference relative to either one of the first and second optical signals; and
(v) selecting the third optical signal individually and in combination with either or both of the first and second optical signals to produce an additional selection of optical signals, such that said corresponding electrical signal has additional amplitudes corresponding to the additional selections, and wherein the amplitude determining step also determines the additional amplitudes and the step of computing the phase difference between the first and second optical signals also takes into account trigonometrical relationships between the amplitude and phase of all three of the optical signals.

13. A method according to claim 12, wherein the third optical signal is provided by splitting one of the first and second intensity-modulated light beams.

14. A method according to claim 12, wherein one of the selections selects none of the optical signals, and the corresponding amplitude measurement is used as an offset correction for the other amplitude measurements.

15. A method according to claim 12, wherein the predetermined phase difference comprises about 90 degrees at said high frequency.

16. A method according to claim 15, wherein, where the first optical signal (S1) has intensity modulation of instantaneous amplitude $A_1=A_{01} \sin(2\pi f_{mod}t+\phi_1)$ where $A_{01}$ is the maximum amplitude and $\phi_1$ is the phase for the major Fourier component and modulation frequency ($f_{mod}$), the second optical signal (S2) has intensity modulation of instantaneous amplitude $A_2=A_{02} \sin(2\pi f_{mod}t+\phi_2)$ where $A_{02}$ is the maximum amplitude and $\phi_2$ the phase for the major Fourier component and modulation frequency ($f_{mod}$), the third optical signal (S3) has intensity modulation of instantaneous amplitude $A_3=A_{03} \sin(2\pi f_{mod}t+\phi_3)$ where $A_{03}$ is the maximum amplitude and $\phi_3$ the phase for the major Fourier component and the modulation frequency ($f_{mod}$), the control and computing means (18) computes the phase difference ($\phi$) as:

$$\phi_1-\phi_2=\arctan\{[(A_{23}^2-A_{02}^2-A_{03}^2)(2A_{01}A_{02})]/[(A_{12}^2-A_{01}^2A_{02}^2)(2A_{02}A_{03})]\}$$

where $A_{12}$ is the maximum amplitude corresponding to the combination of the first and second optical signals and $A_{23}$ is the maximum amplitude corresponding to the combination of the second and third optical signals.

17. A method according to claim 12, wherein the amplitudes correspond to each of the first, second and third optical signals alone, the sum of the first and second optical signals, the sum of the first and third optical signals and the sum of the second and third optical signals.

18. A method according to claim 17, wherein the amplitudes correspond also to the sum of all three optical signals.

19. Apparatus for measuring phase difference between intensity-modulated optical signals comprising:
(i) means (20/1,20/2) for providing a first optical signal (S1) and a second optical signal (S2) both intensity-modulated at the same modulation frequency;
(ii) a selection unit (12) for selecting sequentially the first and second optical signals (S1, S2) individually and in combination and applying the selected optical signals to opto-electric conversion means (14, 16) for deriving from the selected optical signals a corresponding electrical signal at the modulation frequency having a series of different amplitudes corresponding to the different optical signal selections, and for determining amplitudes of the electrical signal corresponding to the different selections; and
(iii) means (18) for controlling said selection unit (12) and computing from the amplitudes, using trigonometrical relationships between amplitude and phase, a phase difference ($\phi_1-\phi_2$) between the intensity-modulated first and second optical signals as received by said deriving means (14, 16).

20. Apparatus according to claim 19, wherein the selection means (12) is arranged to select each of the first (S1) and second (S2) optical signals alone, and the first and second optical signals combined.

21. Apparatus according to claim 19, wherein the selection unit (12) is arranged to select neither of the optical signals (S1, S2) and the control and computing means (18) is arranged to use the resulting amplitude value for offset correction.

22. Apparatus according to claim 19, wherein, where the first optical signal (S1) has intensity modulation of instantaneous amplitude $A_1 = A_{01} \sin(2\pi f_{mod}t + \phi_1)$ where $A_{01}$ is the maximum amplitude and $\phi_1$ is the phase for the major Fourier component and modulation frequency ($f_{mod}$), the second optical signal (S2) has intensity modulation of amplitude $A_2 = A_{02} \sin(2\pi f_{mod}t + \phi_2)$ where $A_{02}$ is the maximum amplitude and $\phi_2$ the phase for the major Fourier component and modulation frequency ($f_{mod}$), and the combined signal has an instantaneous amplitude $A = A_1 + A_2 = A_{12} \sin(2\pi f_{mod}t + \phi_0)$ where $A_{12}$ is the maximum amplitude of the combined first and second optical signals, the control and computing means (18) is arranged to compute the phase difference ($\phi$) as:

$$\phi = \phi_1 - \phi_2 = \arccos[(A_{12}^2 - A_{01}^2 - A_{02}^2)/(2A_{01}A_{02})]$$

23. Apparatus according to claim 19, further comprising means (54) for generating said intensity-modulated first and second optical signals and coupling same to said providing means (20/1,20/2).

24. Apparatus according to claim 19, further comprising one or more light sources (76) for supplying said optical signals to said providing means (20/1,20/2) and means (74; 78) for providing said modulation.

25. Apparatus according to claim 24, wherein the modulation providing means (74) comprises reference oscillator means (74) for controlling the one or more light sources to modulate light outputted thereby.

26. Apparatus according to claim 19, further comprising means (38) for splitting either one of the first and second intensity-modulated optical signals (S1, S2) to produce said third optical signal (S3).

27. Apparatus according to claim 19, adapted for passing one or both of the optical signals through an optical element (50), further comprising means (68) for varying the wavelength of one or each of the first and second optical signals, and wherein the deriving and determining means (14,16) determines said amplitudes for each of a plurality of wavelengths of said one of the optical signals and the control and computing means (18) computes a said phase difference for each of said plurality of wavelengths and uses the plurality of wavelengths and phase differences to determine chromatic dispersion by said optical element.

28. Apparatus according to claim 19, adapted for passing one of the optical signals through an optical element, further comprising and means (80,82) for varying state of polarization of said one of the optical signals at a specific wavelength, wherein the deriving and determining means (14,16) and the control and computing means (18) are operable to determine said selected amplitudes and compute said phase difference for each of a plurality of said states of polarization, the control and computing means (18) using the resulting plurality of phase difference measurements to determine the maximum difference in group delay for the different states of polarization.

29. Apparatus according to claim 19, adapted for measuring elongation of an optical element through which one of the optical signals is passed, wherein the deriving and determining means (14,16) and control and computing means (18) are operable to determine said amplitudes and compute said phase difference for each of a plurality of length states of the optical element and compute elongation in dependence thereupon.

30. Apparatus according to claim 19, further comprising means (38) for providing a third optical signal (S3) intensity-modulated with modulation at said modulation frequency and a predetermined phase difference relative to either of the first and second optical signals, and wherein the selection unit (12) sequentially selects the third optical signal (S3) individually and in combination with either and/or both of the first and second optical signals (S1, S2) to produce an additional selection of optical signals, the deriving means (14,16) derives said electrical signal having additional amplitudes corresponding to the additional selections, and determines the amplitudes corresponding to the additional selections, and the control and computing means (18) is operable, when computing said phase difference, to take into account the amplitudes corresponding to the additional selections involving the third optical signal.

31. Apparatus according to claim 30, wherein the deriving means (14,16) comprises means (16) for determining the amplitudes of each of the first, second and third optical signals alone, the sum of the first and second optical signals, the sum of the first and third optical signals, and the sum of the second and third optical signals.

32. Apparatus according to claim 31, wherein the amplitude determining means (16) also determines the amplitude corresponding to the sum of all three optical signals.

33. Apparatus according to claim 30, wherein the predetermined phase difference is substantially 90 degrees at said high frequency.

34. Apparatus according to claim 30, wherein, where the first optical signal (S1) has intensity modulation of instantaneous amplitude $A_1 = A_{01} \sin(2\pi f_{mod}t + \phi_1)$ where $A_{01}$ is the maximum amplitude and $\phi_1$ is the phase for the major Fourier component and modulation frequency ($f_{mod}$), the second optical signal (S2) has intensity modulation of instantaneous amplitude $A_2 = A_{02} \sin(2\pi f_{mod}t + \phi_2)$ where $A_{02}$ is the maximum amplitude and $\phi_2$ the phase for the major Fourier component and modulation frequency ($f_{mod}$), the third optical signal (S3) has intensity modulation of instantaneous amplitude $A_3 = A_{03} \sin(2\pi f_{mod}t + \phi_3)$ where $A_{03}$ is the maximum amplitude and $\phi_3$ the phase for the major Fourier component and modulation frequency ($f_{mod}$), the control and computing means (18) computes the phase difference ($\phi$) as:

$$\phi_1 - \phi_2 = \arctan\{[(A_{23}^2 - A_{02}^2 - A_{03}^2)(2A_{01}A_{02})]/[(A_{12}^2 - A_{01}^2 - A_{02}^2)(2A_{02}A_{03})]\}$$

where $A_{12}$ is the maximum amplitude corresponding to the combination of the first and second optical signals and $A_{23}$ is the maximum amplitude corresponding to the combination of the second and third optical signals.

35. Apparatus according to claim 30, wherein the selection unit (12) selects none of the optical signals and the amplitude determining means (16) determines the corresponding amplitude and uses it as an offset correction for the other amplitude measurements.

36. Apparatus according to claim 30, further comprising one or more light sources (76) for supplying said optical signals to said selection unit and means (74;78) for providing said modulation.

37. Apparatus according to claim 36, wherein the modulation providing means (74) comprises reference oscillator means (74) for controlling the one or more light sources to modulate light outputted thereby.

38. Apparatus according to claim 36, wherein the modulation-providing means comprises an optical light modulator means (78) for modulating light outputted from said one or more light sources.

39. Apparatus for measuring phase difference between intensity-modulated optical signals comprising:
means (20/1,20/2) for providing a first optical signal (S1) and a second optical signal (S2) both intensity-modulated at the same modulation frequency;
a selection unit (12) for selecting sequentially the first and second optical signals (S1, S2) individually and in combination;
means (14, 16) for deriving from the selected optical signals a corresponding electrical signal at the modulation frequency having a series of different amplitudes corresponding to the different optical signal selections, and for determining amplitudes of the electrical signal corresponding to the different selections;
means (18) for controlling said selection unit (12) and computing from the amplitudes, using trigonometrical relationships between amplitude and phase, a phase difference ($\phi_1-\phi_2$) between the intensity-modulated first and second optical signals as received by said deriving means (14, 16), and
means (38) for providing a third optical signal (S3) intensity-modulated with modulation at said modulation frequency and a predetermined phase difference relative to either of the first and second optical signals,
wherein the selection unit (12) sequentially selects the third optical signal (S3) individually and in combination with either and/or both of the first and second optical signals (S1, S2) to produce an additional selection of optical signals, the deriving means (14, 16) derives said electrical signal having additional amplitudes corresponding to the additional selections, and determines the amplitudes ocrresponding the the additional selections, and the control and computing means (18) is operable, when computing said phase difference between the intensity-modulated first and second optical signals, to take into account the amplitudes corresponding to the additional selections involving the third optical signal.

40. Apparatus according to claim 39, wherein the deriving means (14,16) comprises means (16) for determining the amplitudes of each of the first, second and third optical signals alone, the sum of the first and second optical signals, the sum of the first and third optical signals, and the sum of the second and third optical signals.

41. Apparatus according to claim 40, wherein the amplitude determining means (16) also determines the amplitude corresponding to the sum of all three optical signals.

42. Apparatus according to claim 39, wherein the predetermined phase difference is substantially 90 degrees at said modulation frequency.

43. Apparatus according to claim 42, wherein, where the first optical signal (S1) has intensity modulation of instantaneous amplitude $A_1=A_{01}\sin(2\pi f_{mod}t+\phi_1)$ where $A_{01}$ is the maximum amplitude and $\phi_1$ is the phase for the major Fourier component and modulation frequency ($f_{mod}$), the second optical signal (S2) has intensity modulation of instantaneous amplitude $A_2=A_{02}\sin(2\pi f_{mod}t+\phi_2)$ where $A_{02}$ is the maximum amplitude and $\phi_2$ the phase for the major Fourier component and modulation frequency ($f_{mod}$) the third optical signal (S3) has intensity modulation of instantaneous amplitude $A_3=A_{03}\sin(2\pi f_{mod}t+\phi_3)$ where $A_{03}$ is the maximum amplitude and $\phi_3$ the phase for the major Fourier component and modulation frequency ($f_{mod}$), the control and computing means (18) computes the phase difference ($\phi$) as:

$$\phi_1-\phi_2=\arctan\{[(A_{23}^2-A_{02}^2-A_{03}^2)(2A_{01}A_{02})]/[(A_{12}^2-A_{01}^2-A_{02}^2)(2A_{02}A_{03})]\}$$

where $A_{12}$ is the maximum amplitude corresponding to the combination of the first and second optical signals and $A_{23}$ is the maximum amplitude corresponding to the combination of the second and third optical signals.

44. Apparatus according to claim 39, wherein the selection unit (12) selects none of the optical signals and the amplitude determining means (16) determines the corresponding amplitude and uses it as an offset correction for the other amplitude measurements.

45. Apparatus according to claim 44, wherein the modulation-providing means comprises an optical light modulator means (78) for modulating light outputted from said one or more light sources.

46. Apparatus according to claim 39, further comprising means (54) for generating said intensity-modulated first and second optical signals and coupling same to said providing means (20/1,20/2).

47. Apparatus for use in measuring phase difference between intensity-modulated optical signals comprising:
(i) means (20/1,20/2) for providing a first optical signal (S1) and a second optical signal (S2) both intensity-modulated at the same modulation frequency;
(ii) a selection unit (12) for selecting sequentially the first and second optical signals (S1, S2) individually and in combination and having an interface for coupling to a computer;
(iii) means (14, 16) for deriving from the selected optical signals a corresponding electrical signal at the modulation frequency having a series of different amplitudes corresponding to the different optical signal selections, determining amplitudes of the electrical signal corresponding to the different selections, and supplying the amplitude values to an interface for coupling to said computer; and
(iv) software for programming said computer to control said selection unit (12) and compute from the amplitudes, using trigonometrical relationships between amplitude and phase, a phase difference ($\phi_1-\phi_2$) between the modulation of the first and second optical signals as received by said deriving means (14, 16).

48. Apparatus according to claim 47, further comprising means (54) for generating said intensity-modulated first and second optical signals and coupling same to said providing means (20/1,20/2).

49. A method of measuring phase differences between at least first and second intensity-modulated optical signals (S1,S2) modulated at the same modulation frequency comprising the steps of:
(i) sequentially selecting the two optical signals individually and then in combination;
(ii) deriving from the selected optical signals a corresponding electrical signal at the modulation frequency having a series of different amplitudes corresponding to the first and second optical signals and their combinations, and determining the different amplitudes;
(iii) using trigonometrical relationships between amplitude and phase angle, computing from the determined amplitudes the phase difference ($\phi_1-\phi_2$) between the intensity-modulated first and second optical signals, (iv) providing a third optical signal (S3) intensity-modulated at said modulation frequency, the third optical signal modulation having a predetermined phase difference relative to either one of the first and second optical signals; and (v) selecting the third optical signal individually and in combination with either or both of the first and second optical signals to produce additional optical signal selections, such that said corresponding electrical signal has additional amplitudes corresponding to the additional selections, and wherein the amplitude determining step also determines the additional amplitudes and the step of computing the phase difference between the first and second optical signals takes into account trigonometrical relationships between the amplitude and phase of all three of the intensity-modulated optical signals.

50. A method according to claim 49, wherein the amplitudes correspond to each of the first, second and third optical signals alone, the sum of the first and second optical signals, the sum of the first and third optical signals and the sum of the second and third optical signals.

51. A method according to claim 50, wherein the amplitudes also include an amplitude corresponding to the sum of all three optical signals.

52. A method according to claim 49, wherein the predetermined phase difference comprises about 90 degrees at said modulation frequency.

53. A method according to claim 52, wherein, where the first optical signal (S1) has intensity modulation of instantaneous amplitude $A_1 = A_{01} \sin(2\pi f_{mod} t + \phi_1)$ where $A_{01}$ is the maximum amplitude and $\phi_1$ is the phase for the major Fourier component and modulation frequency $f_{mod}$, the second optical signal (S2) has intensity modulation of instantaneous amplitude $A_2 = A_{02} \sin(2\pi f_{mod} t + \phi_2)$ where $A_{02}$ is the maximum amplitude and $\phi_2$ the phase for the major Fourier component and modulation frequency $f_{mod}$, the third optical signal (S3) has intensity modulation of instantaneous amplitude $A_3 = A_{03} \sin(2\pi f_{mod} t + \phi_3)$ where $A_{03}$ is the maximum amplitude and $\phi_3$ the phase for the major Fourier component and modulation frequency $f_{mod}$, the control and computing means (18) computes the phase difference ($\phi$) between the intensity-modulated first and second optical signals as:

$$\phi_1 - \phi_2 = \arctan\{[(A_{23}^2 - A_{02}^2 - A_{03}^2)(2A_{01}A_{02})]/[(A_{12}^2 - A_{01}^2 - A_{02}^2)(2A_{02}A_{03})]\}$$

where $A_{12}$ is the maximum amplitude corresponding to the combination of the first and second optical signals and $A_{23}$ is the maximum amplitude corresponding to the combination of the second and third optical signals.

54. A method according to claim 49, wherein one of the selections selects none of the optical signals, and the corresponding amplitude measurement is used as an offset correction for the other amplitude measurements.

55. A method according to claim 49, wherein the third optical signal is provided by splitting one of the first and second intensity-modulated light beams.

* * * * *

UNITED STATES PATENT AND TRADEMARK OFFICE
CERTIFICATE OF CORRECTION

PATENT NO. : 6,429,929 B2  Page 1 of 1
DATED : August 6, 2002
INVENTOR(S) : Babin, Francois and Cyr, Normand It is certified that error appears in the above-identified patent and that said Letters Patent is hereby corrected as shown below:

Column 4,
Line 34, delete "22/1" and insert -- 24/1 --
Line 34, delete "22/2" and insert -- 24/2 --

Column 11,
Lines 5 and 9, delete "and" and insert -- at --

Column 12,
Lines 20, 24 and 28, delete "and" and insert -- at --

Column 13,
Lines 12 and 16, delete "and" and insert -- at --

Column 14,
Lines 38, 42 and 46, delete "and" and insert -- at --

Column 15,
Lines 60 and 64, delete "and" and insert -- at --

Column 16,
Line 1, delete "and" and insert -- at --

Column 18,
Lines 3, 7 and 11, delete "and" and insert -- at --

Signed and Sealed this

Tenth Day of June, 2003

JAMES E. ROGAN
*Director of the United States Patent and Trademark Office*